(12) United States Patent
Guidat et al.

(10) Patent No.: US 10,046,303 B2
(45) Date of Patent: Aug. 14, 2018

(54) DISASSEMBLABLE STACKED FLOW REACTOR

(71) Applicant: Corning Incorporated, Corning, NY (US)

(72) Inventors: Roland Guidat, Blennes (FR); Olivier Lobet, Villiers sous Grez (FR); Alexis Maury, Chateau (FR)

(73) Assignee: Corning Incorporated, Corning, NY (US)

( * ) Notice: Subject to any disclaimer, the term of this patent is extended or adjusted under 35 U.S.C. 154(b) by 154 days.

(21) Appl. No.: 14/786,829

(22) PCT Filed: Apr. 22, 2014

(86) PCT No.: PCT/US2014/034936
§ 371 (c)(1),
(2) Date: Oct. 23, 2015

(87) PCT Pub. No.: WO2014/176231
PCT Pub. Date: Oct. 30, 2014

(65) Prior Publication Data
US 2016/0067671 A1    Mar. 10, 2016

(30) Foreign Application Priority Data
Apr. 26, 2013    (EP) ..................................... 13305554

(51) Int. Cl.
*B01J 19/24* (2006.01)
*B01J 19/00* (2006.01)

(52) U.S. Cl.
CPC .......... *B01J 19/249* (2013.01); *B01J 19/0093* (2013.01); *B01J 2219/0086* (2013.01);
(Continued)

(58) Field of Classification Search
CPC ........... B01J 19/24; B01J 19/00; B01J 19/249
(Continued)

(56) References Cited

U.S. PATENT DOCUMENTS 5,534,328 A * 7/1996 Ashmead .............. B01F 5/0604
                                                         210/150
5,829,517 A    11/1998 Schmid et al.
(Continued)

FOREIGN PATENT DOCUMENTS

| CN | 101408343 B | 7/2010 |
|---|---|---|
| CN | 201757189 U | 3/2011 |

(Continued)

OTHER PUBLICATIONS

CN201480023576.8 Second Office Action dated Dec. 23, 2016, China Patent Office.
(Continued)

*Primary Examiner* — Huy Tram Nguyen
(74) *Attorney, Agent, or Firm* — Gregory V. Bean (57) ABSTRACT

A plate-type flow reactor device with a first plate (20) having first and second opposing surfaces (22, 24) and one or more through-holes (26); a second plate sealed against the first surface (22) by at least two first O-rings (50); a third plate (40) sealed against the second surface (24) by at least one second O-ring (60); two or more first elongated channels (70) defined between the first surface (22) and the second plate and one or more second elongated channels (80) defined between the second surface (24) and the third plate, wherein each first channel communicates with the at least one second channel (80) via one or more of the through-holes (26) through the first plate (20), and said one first channel (70a) communicates with another first channel (70b) of the two or more first channels (70) only via said at least one second channel (80), and each first channel (70) is
(Continued)

individually surrounded by at least one of the first O-rings (50) and the at least one second is individually surrounded by the at least one second O-ring (60).

13 Claims, 5 Drawing Sheets

(52) U.S. Cl.
CPC ............... *B01J 2219/00783* (2013.01); *B01J 2219/00808* (2013.01); *B01J 2219/00824* (2013.01); *B01J 2219/00831* (2013.01); *B01J 2219/00855* (2013.01); *B01J 2219/00867* (2013.01); *B01J 2219/2453* (2013.01); *B01J 2219/2459* (2013.01); *B01J 2219/2487* (2013.01); *B01J 2219/2488* (2013.01); *B01J 2219/2493* (2013.01); *B01J 2219/2498* (2013.01)

(58) Field of Classification Search
USPC .......................................................... 422/601
See application file for complete search history.

(56) References Cited

U.S. PATENT DOCUMENTS

| | | | |
|---|---|---|---|
| 5,843,385 | A | 12/1998 | Dugan |
| 7,946,037 | B2 * | 5/2011 | Miyoshi .............. B01F 13/0059 29/890.09 |
| 8,941,453 | B2 | 1/2015 | Yano et al. |
| 2001/0041154 | A1 | 11/2001 | Murata et al. |
| 2005/0034847 | A1 | 2/2005 | Graham et al. |
| 2007/0217970 | A1 | 9/2007 | Saito et al. |
| 2011/0165033 | A1 | 7/2011 | Meschke et al. |

FOREIGN PATENT DOCUMENTS

| | | |
|---|---|---|
| CN | 202011746 U | 10/2011 |
| CN | 202097808 U | 1/2012 |
| DE | 102006009791 A1 | 9/2007 |
| DE | 102006028852 A1 | 12/2007 |
| DE | 102007054043 A1 | 5/2009 |
| JP | 09366704 | 7/1999 |

OTHER PUBLICATIONS

European Patent Office; International Search Report; dated Jul. 10, 2014; pp. 1-5.

* cited by examiner

DISASSEMBLABLE STACKED FLOW REACTOR

CROSS-REFERENCE TO RELATED APPLICATIONS

This application claims the benefit of priority under 35 U.S.C. § 371 of International Patent Application Serial No. PCT/US14/34936, filed on Apr. 22, 2014, which claims the benefit of priority under 35 U.S.C. § 119 of European Patent Application Serial No. 13305554.1, filed on Apr. 26, 2013, the content of which is relied upon and incorporated herein by reference in its entirety.

FIELD

The field of this disclosure is flow reactors, particularly for continuous flow and employing glass or ceramic fluidic plates stacked in a non-permanent fashion to form reactors or reactor modules that can be disassembled, such as for inspection and/or cleaning.

BACKGROUND

Plate-and-gasket style heat exchangers are known, typically in the form of stacks of metallic plates having an elastomeric circumferential seal between two adjacent plates. The plates are usually stacked directly against each other, with the resulting plate stack being inserted between two thicker end-plates. The mechanical strength required to make the stack tight is generally provided by through-rods with adjustable nuts on one or two threaded ends, providing a compressive force to the stack via the end plates.

This type of stack construction is suitable for metallic or similarly flexible plates, and particularly for heat exchangers. Thanks to the generally high elasticity of metal and its resulting ability to withstand deformation without damage, metallic parts can deform slightly to cope with non-perfect alignment and/or thickness differences while maintaining a tight seal without risk of breaking. In addition, in heat exchanger applications, a tight seal is not strictly necessary in the interior of the plates. This is because a heat exchanger is not very sensitive to the effects of poor interior wall sealing, such as poor residence time distribution, dead zones and/or by-pass paths. Ultimately, such defects caused by poor internal wall sealing will just reduce slightly the overall heat exchange performance, and this can be compensated by an increase in the heat exchange surface area.

For example, DE19617396 describes a stack of plates with sealing using a peripheral elastomer gasket. The gasket is placed in a groove, or can be potentially directly formed in the groove by injection. The plates may be made of metal or graphite, both of which have flexibility much higher than ceramic or glass materials.

In DE102006009791 is disclosed a stack of ceramic plates sealed in part with O-ring gaskets inserted in a rectangular groove located close to the edges of the plates. The groove is so designed that it can contain all the O-ring volume after compression, and the plates are compressed to physically rest on each other, purportedly to minimize the mechanical stress resulting of the compression of the stack and to avoid any fluid by-pass between separate fluid paths by fluid traveling in any unintended gap that may remain between the two plates that can occur when there is any gap remaining between the facing surfaces of two adjacent plates. Where plates are somewhat rough or slightly warped, sealing by direct-contact compression between the surfaces of the plates imposes stresses that may be too much for materials such as glass and ceramic.

In US20110165033 is described a stack of ceramic plates with a flat gasket formed of resilient or compressible material to ensure the tightness between plates. This structure is intended to cope with the distortion of the ceramic plates (the distortion present before stacking) without any risk of breakage. The proposed solution has, however, many disadvantages. With the use of a flat gasket, the level of pressure required to seal the assembly is significantly higher that the pressure of the fluid within the device (a value about five times higher is indicated in the patent document) leading to constraints on the design of the ceramic plate. Further, due to such high compression pressures, the assembly will also be very sensitive to any perturbation(s) due to ageing, temperature variations, and other variations over time, particularly if an individual stack includes more than the total of four plates shown in the example of the patent. Still further, due to the high compression pressure, the gasket will not resume its original shape upon removal from the assembly, making the use of a new gasket mandatory after each disassembly, leading to additional cost for the end user. Although it may be good practice in some processes to replace a gasket after every disassembly, some other gaskets (O rings for example) are much more tolerant and can, in practice, in appropriate cases, be re-used several times. Still further, as seen from the patent figures and description generally, the particular gasket design is closely tied to the particular flow pattern or plate design with which the gasket cooperates. Thus the presented gasket embodiment can be applied only with a specific plate design, and any changes in the fluidic design require significant changes in gasket design, and complex fluidic channels would require complex gasket shapes.

There is then a need to find a specific, reliable, and reasonably cheap solution for non-permanent ("disassemblable") sealing of a plate-type continuous flow reactor having plates of ceramic and/or glass material.

SUMMARY

According to an aspect of the present disclosure, a plate-type flow reactor device is provided, comprising a first plate having first and second opposing surfaces and one or more through-holes; a second plate sealed against the first surface by at least two first O-rings; a third plate sealed against the second surface by at least one second O-ring; two or more first elongated channels defined between the first surface and the second plate and one or more second elongated channels defined between the second surface and the third plate, wherein each first channel communicates with the at least one second channel via one or more of the through-holes through the first plate, and said one first channel communicates with another first channel of the two or more first channels only via said at least one second channel, and each first channel is individually surrounded by at least one of the first O-rings and the at least one second is individually surrounded by the at least one second O-ring. Among other advantages, this structure provides for individual sealing of the channels of the reactor, preventing undesirable bypass flows.

Other further embodiments, features, and advantages of the present disclosure will be described below.

DETAILED DESCRIPTION

Reference will now be made in detail to the accompanying drawings which illustrate certain instances of the devices and methods described generally herein. Whenever possible, the same reference numerals will be used throughout the drawings to refer to the same or like parts.

Figure 1:
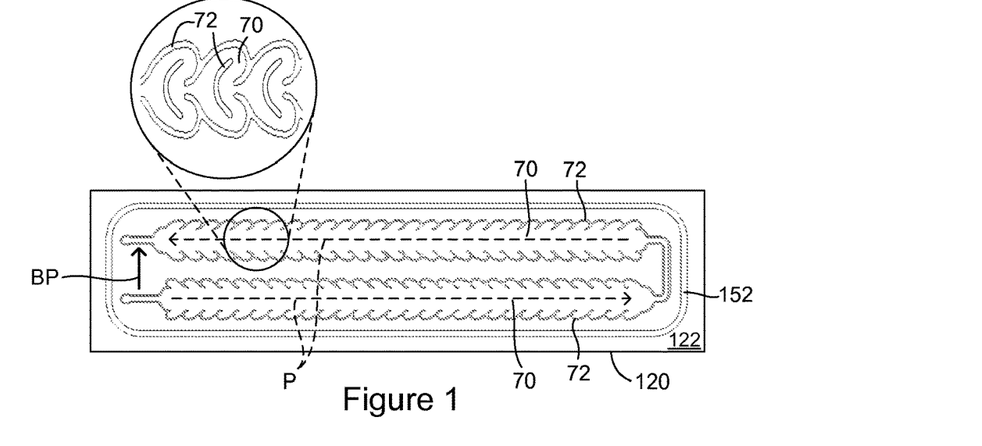
FIG. 1 is a plan view of a reactor or module plate having a representative fluid channel formed therein or thereon, with a peripheral O-ring seal.

FIG. 1 is a plan view of a plate 120 for use in a flow reactor or flow reactor module, with the plate 120 having a surface 122 with a representative fluid channel 70 formed therein or thereon, with a peripheral O-ring seal or groove 152 for a peripheral O-ring seal. The fluid channel 70 is bounded by walls 72, which may include both interior and exterior walls 72 providing additional structure to the interior of the channel 70 as shown in the enlarged inset in the figure. The fluid channel 70 defines a fluid path P as indicated by the dashed arrows with intended flow in the direction(s) indicated by the arrows. FIG. 1 may be used to illustrate a specific problem in the use of a peripheral O-ring seal, namely, the risk and likelihood of a fluidic bypass, indicated by the arrow BP, occurring at the position and direction indicated.

Specifically, where less than ideally flat and smooth plates are used, a direct contact seal across the entire surface of glass or ceramic plates produces too much stress in the plates as they are forced to conform to each other, leading to unacceptable risk of mechanical breakage. Accordingly, O-ring sealing may be used for sealing without relying on direct and conforming contact between plates. But in the case of a peripheral O-ring seal as in FIG. 1, although peripheral leakage may be prevented, leakage directly between high and low pressure areas of the channel 70, namely at the location the arrow BP in this case, is likely.

Figure 2:
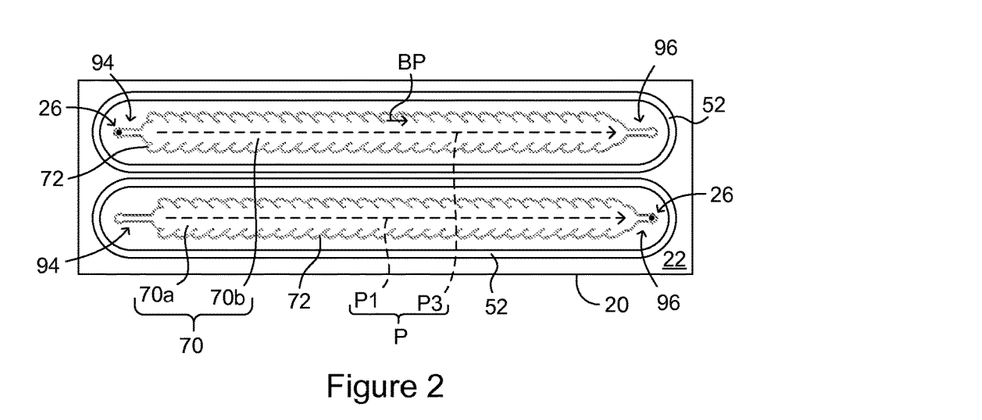
FIG. 2 is a plan view of a first surface of one embodiment of a reactor or module plate according to the present disclosure.
Figure 3:
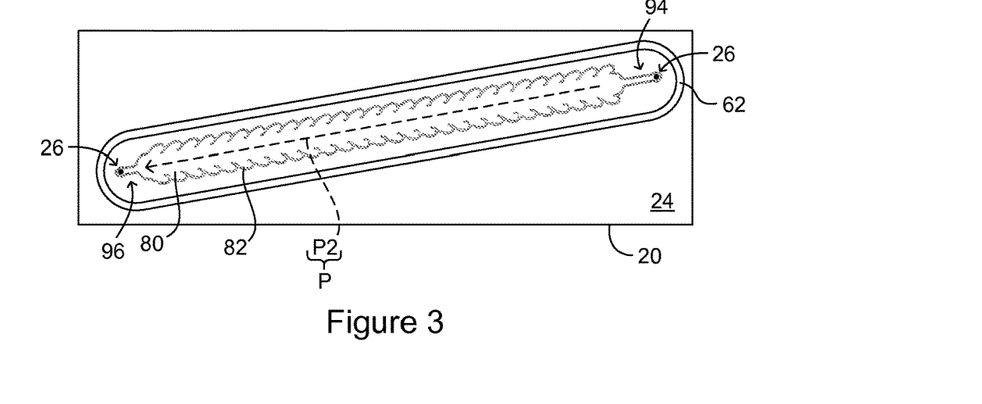
FIG. 3 is a plan view of a second surface of the plate of FIG. 2.

FIG. 2 is a plan view of a first surface 22 of one embodiment of a reactor or module plate 20 according to the present disclosure, and FIG. 3 is a plan view of a second and opposing surface 24 of the plate 20 of FIG. 2. The plate 20 has one or more through-holes, in this case two through-holes 26 extending from the first surface 22 to the second surface 24. In use, the first surface 22 of the first plate 20 (FIG. 2) is sealed against a second plate (not shown in this figure) by at least two first O-rings positioned between the plates in the O-ring grooves 52, and the second surface 24 of the first plate 20 (FIG. 3) is sealed against a third plate (not shown in this figure) by at least one second O-ring in the O-ring groove 62. In the embodiment of FIGS. 2 and 3, two elongated channels 70 are defined between the first surface 22 of the first plate 20 and the second plate (not shown in this figure) by walls or contours 72 on or in the first surface 22 (FIG. 2), and one second elongated channel 80 is defined between the second surface 24 of the first plate 20 and the third plate (not shown in this figure) by walls or contours 82 on or in the second surface 24 (FIG. 3). Each of the channels 70a, 70b, 80 of the first or extends from a first end 94 of the respective channel to a second end 96 of the respective channel. The holes 26 through the plate 20 connect the end 96 of channel 70a with the beginning 94 of channel 80, and the end 96 of channel 80 with the beginning 94 of channel 70b.

Accordingly, for a given one 70a of the first channels 70, that channel 70a communicates fluidically with the second channel 80 via a through-hole 26, and communications fluidically with the other 70b of the first channels 70 only via a path P (made up of sub-paths P1, P2, and P3) that includes the second channel 80. Each first channel 70 is also individually surrounded by one of the first O-rings 50, while the second channel 80 is surrounded by the second O-ring 60. Because the first channels 70a, 70b on the first surface 22 (FIG. 2) of the plate 20 are individually surrounded by O-rings in the grooves 52, there is no opportunity for a bypass to form that cuts off a substantial portion of the fluid path P, as in FIG. 1 above. Further, because the first and second ends 94, 96 of the first channels 70a, 70b are positioned near respective opposite edges of the plate 20 such that the channels 70a, 70b extend laterally across the plate, there is also little opportunity for a bypass flow to form along the channel within the boundaries of the respective O-ring channel 52. At most, a small bypass BP (FIG. 2) might form, passing a local feature of the walls or contours 72, but as the pressure differential will be small and the open area in the path itself will be nearby, significant bypass flow is unlikely. In essence, each single pass of the process fluid across the surface 22 of the plate 20 is surrounded by a compressible O-ring, desirably of polymeric material. Bypass between adjacent channels is thus prevented. Further, the O-ring position (the shape of the O-ring groove 52) is not tied to the specific detailed shape of the fluid channels 70, unlike the flat gasket in previously proposed flat-gasket solutions.

In the embodiment of FIGS. 2 and 3, the channels 70, 80 are defined by walls or contours 72, 82 on the respective first and second surfaces 22, 24 of the plate 20. Further, there is only one second channel 80 defined on (or near) the second surface 22. Both of these characteristics are optional, as may be appreciated from the embodiments represented in FIGS. 4-12.

Figure 4:
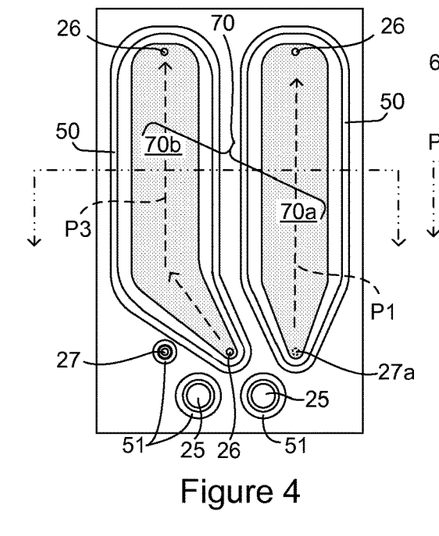
FIG. 4 is a diagrammatic representation of a cross section parallel to the plates of structures located at or near the interface between a first surface of a first plate and a surface of a second plate, according to other embodiments of the present disclosure.
Figure 5:
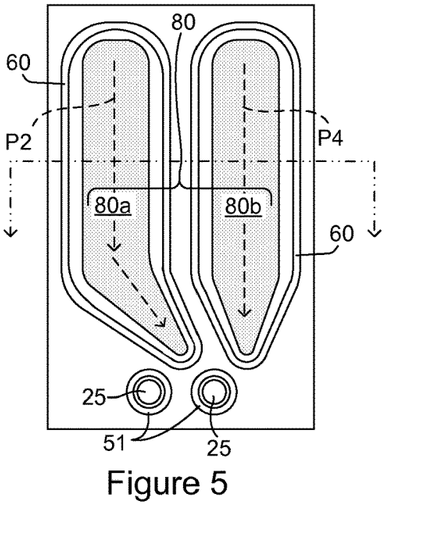
FIG. 5 is a diagrammatic representation of a cross section parallel to the plates of structures located at or near the interface between a second surface of a first plate and a surface of a third plate according to the embodiment(s) of FIG. 4.

With particular reference to FIGS. 4-12, FIG. 4 is a diagrammatic representation of a cross section parallel to the plates of structures located at or near the interface between a first surface 22 of a first plate 20 and a surface 32 of a second plate 30, and FIG. 5 is a diagrammatic representation of a cross section parallel to the plates of structures located at or near the interface between a second surface 24 of a first plate 20 and a surface 42 of a third plate 40 according to the embodiment(s) of FIGS. 4-12. The structures in FIGS. 4 and 5 are seen from the directions shown by the respective cross section indications in FIGS. 6-8 and 12.

As may be appreciated from the figures and description below, although it is a presently preferred alternative to include (as in FIGS. 2 and 3) channels 70 and 80 defined by walls or contours 72 and 82 on opposite sides 22 and 24 of the same plate 20, this is not necessary in every embodiment according to the present disclosure. The channels 70 and 80 may be defined solely by walls or contours on opposite sides of a first plate 20, and merely closed but not otherwise defined by second and third flat plates 30, 40, as in the embodiment of FIG. 6. Alternatively, or walls or contours on the facing surfaces 32, 42, of the second and third plates 30,40 may participate with walls or contours on the first plate 20 to define the channels 70 and 80, as in the embodiments of FIGS. 7, 9, and 12. In still another alternative shown in FIG. 8, walls or contours on the facing surfaces 32, 42, of the second and third plates 30, 40 may define the channels 70 and 80, with first and second surfaces 22, 24 of the first plate 20 closing but not defining the channels 70 and 80. (The cross-sections of FIGS. 4 and 5 represent the indicated cross sections on each of FIGS. 6-8 and 12, except that the holes 26 would not appear in the cross section corresponding to FIG. 8, as they would be found in the first plate 20, not shown when the cross sections of FIGS. 4 and 5 are taken as indicated in FIG. 8.)

Also, although, as in FIGS. 2-3, only a single channel 80 may be used on or near the second surface 24 of the first plate 20, it is preferable to have at least two channels 70 defined on or near the first surface 22 of the first plate 20 and two channels 80 defined on or near the second surface 24 of the first plate 20, such as in the embodiments of FIGS. 4-12. Having at least two channels on each surface better utilizes the available surface area of the plate 20, and better spreads the compression load (through two O-rings 60 instead of one O-ring) on the second surface 24.

With respect to the features shown in the cross sections of FIGS. 4 and 5 and respectively in FIGS. 6-12, a plate-type flow module or flow reactor 10 is shown comprising at least a first plate 20 and at least second and third plates 30, 40. The first plate has a first surface 22 and a second surface 24 opposite the first surface, and includes one or more through-holes 26 extending from the first surface 22 to the second surface 24. The second plate has a second plate surface 32 sealed against the first surface 22 of the first plate 20 by at least two first O-rings 50 positioned between the first surface 22 of the first plate 20 and the second plate surface 32. The third plate 40 has a third plate surface 42 sealed against the second surface 24 of the first by at least one, and desirably by at least two second O-ring(s) 60 positioned between the second surface 24 of the first plate 20 and the third plate surface 42.

Figure 6:
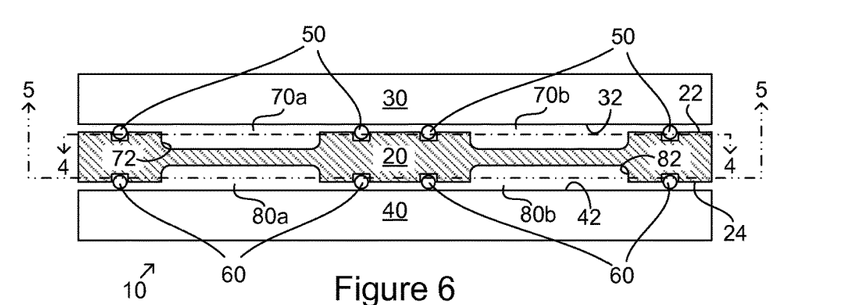
FIG. 6 is a cross section perpendicular to the plates of one embodiment of a plate-type flow reactor having structures such as those represented in FIGS. 4 and 5.
Figure 7:
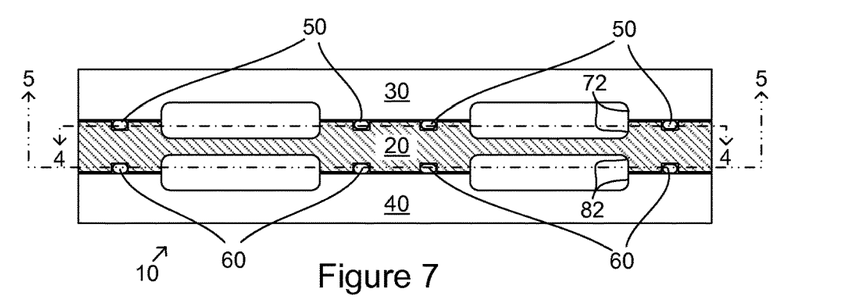
FIG. 7 is a cross section perpendicular to the plates of another embodiment of a plate-type flow reactor having structures such as those represented in FIGS. 4 and 5.
Figure 8:
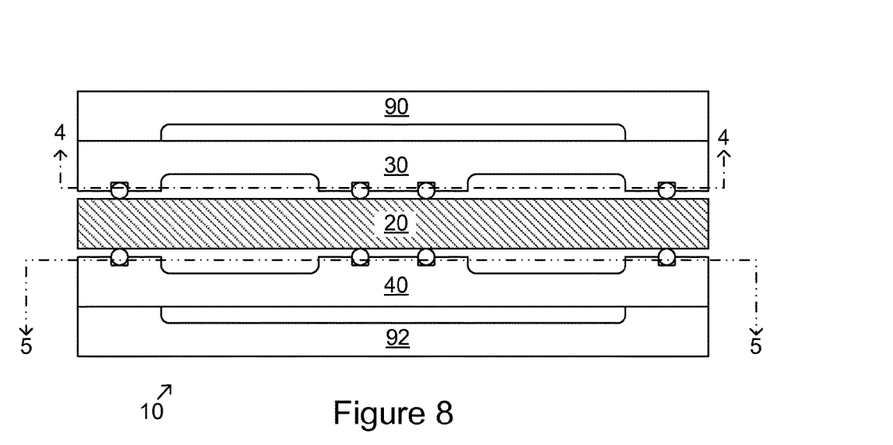
FIG. 8 is a cross section perpendicular to the plates of yet another embodiment of a plate-type flow reactor having structures such as those represented in FIGS. 4 and 5.

Two or more first elongated channels 70 (70a and 70b) are defined between the first surface 22 of the first plate 20 and the second plate surface 32 by contours 72 on or in the first surface 22 (as in FIGS. 6 and 7) and/or the second plate surface 32 (as in FIGS. 7 and 8). One or more, desirably two or more, second elongated channels 80 (80a and 80b) are defined between the second surface 24 of the first plate 20 and the third plate surface 42 by contours 82 on or in the second surface 24 and/or the third plate surface 42. Each channel of said first or second channels 70, 80 extends from a first end 94 of the channel at or near a first edge of the first plate 20 to a second end 96 of the respective channel at or near a second edge of the first plate 20, opposite the first edge.

For each one first channel such as channel 70a of the two or more first channels 70, said one first channel 70a communicates, at the first or second end 94, 96 thereof, or both, with at least one second channel 80 via one or more of the through-holes 26 through the first plate 20, and said one first channel 70a communicates with another first channel 70b of the two or more first channels 70 only via a path P (including in this case sub-paths P1, P2 and P3, and P4) which path P includes at least one second channel 80. Further, each first channel 70 is individually surrounded by at least one of the first O-rings 50 and the at least one, desirably at least two second channel(s) 80 is/are individually surrounded by the at least one, desirably at least two second O-ring(s) 60.

Additional O-rings 51 surround optional additional through-holes 25 useful for passing thermal control fluid or the like, and additional through-hole 27 for process fluid leaving the channel 80b. A through-hole or port 27a may be present in the second plate 30 at the location shown for bringing fluid to the channel 70a.

FIG. 6 shows the stacked reactor or module 10 with the at least two first O-rings 50 and the at least one, desirably at least two O-rings 60 (two in this embodiment) in position before sealing pressure is applied, and FIG. 7 shows a similar assembly after pressure is applied to cause the O-rings 70 and 80 to seal against the respective plates. In the embodiment of FIG. 6, the reactor 10 has first channels 70 defined between the first surface 22 of the first plate 20 and the second plate surface 32 by contours or walls 72 on or in the first surface 22 only, and not on or in the second plate surface 32. In the embodiment of FIG. 7, the reactor 10 has first channels 70 defined between the first surface 22 of the first plate 20 and the second plate surface 32 by contours or walls 72 on or in the first surface 22 and by contours or walls 72 on or in the second plate surface 32. In the embodiment of FIG. 8, the reactor 10 has first channels 70 defined between the first surface 22 of the first plate 20 and the second plate surface 32 by contours or walls 72 on or in the second plate surface 32 only, and not on or in the first surface 22 of the first plate 20. O-ring grooves 52 and 62 for the first O-rings 50 and the second O-ring(s) 60 are desirably present in the first and second surfaces 22, 24, respectively, of the first plate 20. Alternatively, the O-ring grooves 52 may be in the second plate surface 32 of the second plate 30, and O-ring grooves 62 may be in the third plate surface 42 of the third plate 40, as in FIG. 8. Regardless of the particular surface(s) having the O-ring grooves therein, the O-ring grooves 52 and 62 are desirably all of the same shape, or all of the same or similar shapes and all of the same length, such that a single size of O-ring may be used for every one of the channels 70, 80. If the shapes of the grooves 52 and 62 are not identical, still it is desirable that said shapes have a continuity of tangency (that is, in progressing around the shape, the line tangent to the curve of the shape changes smoothly everywhere). This helps make certain that an O-ring can conform to and follow the groove shape(s) selected.

In the embodiment shown in FIG. 8, two additional plates 90, 92 are included in the reactor or module 10 to provide channels 91 for thermal control fluids or the like. Additional plates 90, 92 may be of a deformable material, directly sealed by compression to the respective adjacent plates 30, 40, or via one or more O-rings (not shown), or may be permanently attached.

Figure 9:
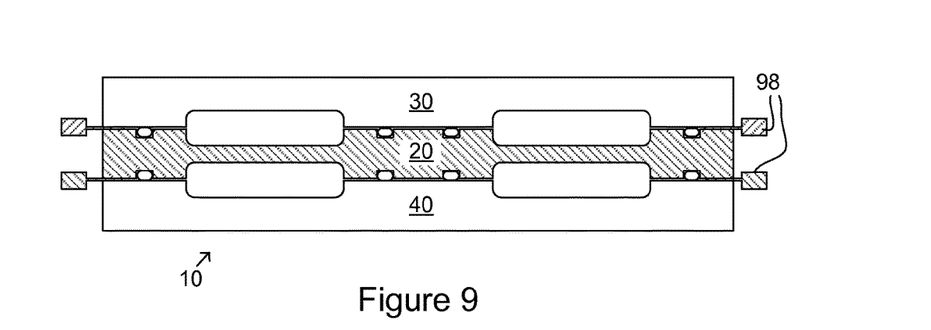
FIG. 9 is a cross section perpendicular to the plates of still another embodiment of a plate-type flow reactor having structures such as those represented in FIGS. 4 and 5, this embodiment including the use of spacers between plates.
Figure 10:
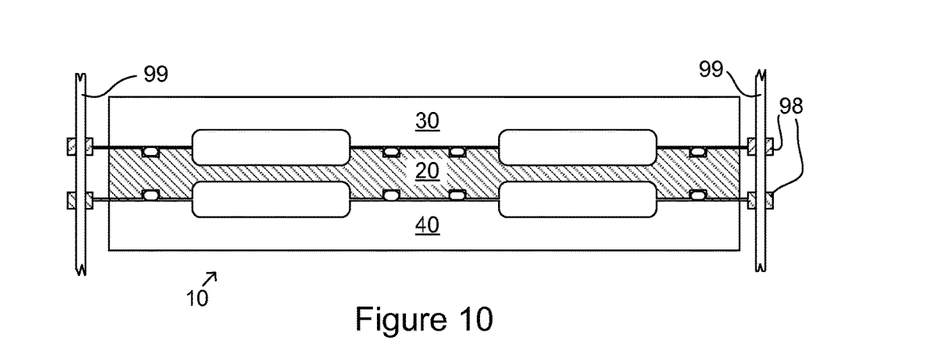
FIG. 10 is a cross section perpendicular to the plates of still another embodiment of a plate-type flow reactor having structures such as those represented in FIGS. 4 and 5, this embodiment including the use of spacers between plates with the spacers positioned on rods.
Figure 11:
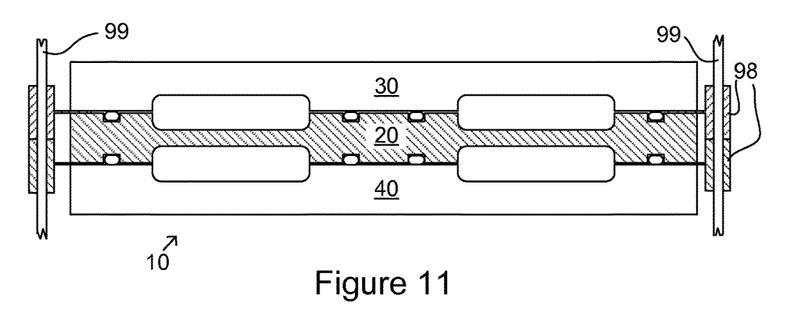
FIG. 11 is a cross section perpendicular to the plates of still another embodiment of a plate-type flow reactor having structures such as those represented in FIGS. 4 and 5, this embodiment including the use of spacers between plates with the spacers both positioned on rods and stacked upon each other.

As shown in the cross section of FIG. 9, according to another aspect of the present disclosure, a reactor or module 10 may include spacers 98 between the respective facing surfaces of the first, second, and third plates 23, 30, 40 so as to maintain a desired minimum clearance and prevent unwanted stresses on the plates. Precise control of the spacing between plates also improves flow and pressure-drop uniformity. As shown in the cross section of FIG. 10, the spacers 98 may be positioned on one or more extended structures such as a rod 99 extending beside the first, second, and third plates 20, 30, 40 in a direction perpendicular to the first surface 22 of the first plate 20. In the embodiment shown, the spacers 98 are threaded onto respective rods 99. As seen in the cross section of FIG. 11, in another optional feature, the spacers 98 may themselves extend sufficiently in a direction along the extended structure or rod 99 such that they may rest on or stack on each other as shown.

Figure 12:
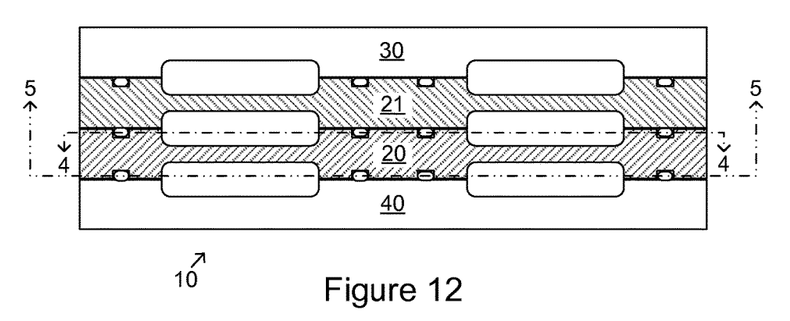
FIG. 12 is a cross section perpendicular to the plates of one more embodiment of a plate-type flow reactor having structures such as those represented in FIGS. 4 and 5.
Figure 13:
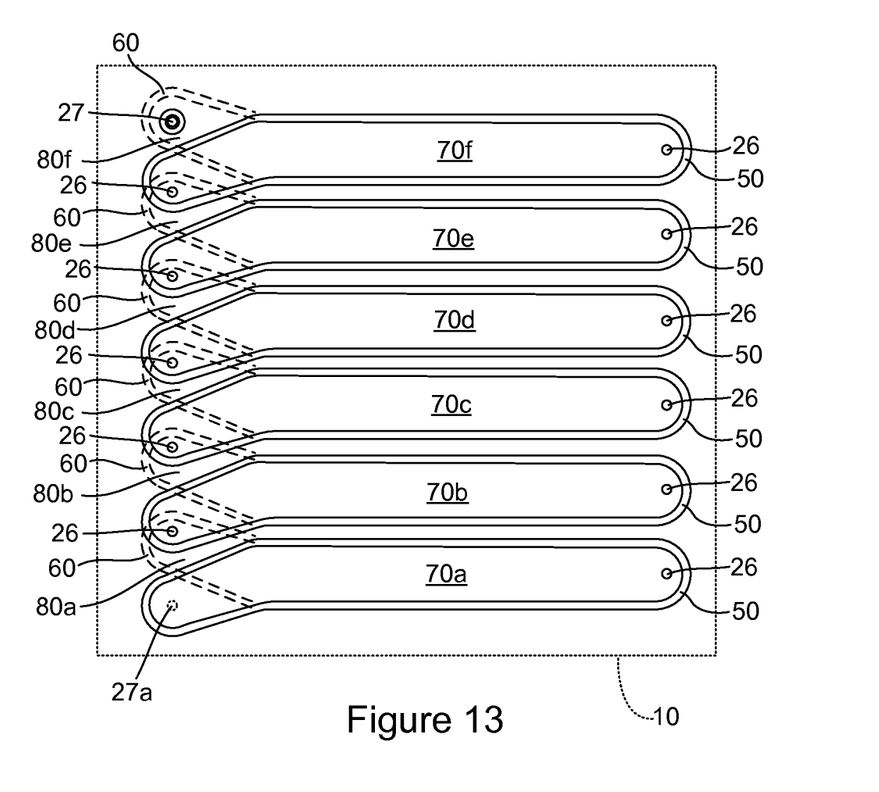
FIG. 13 is a cross sectional view of another variation according to the present disclosure of structures located at or near the interface between a first surface of a first plate and a surface of a second plate and at or near the interface between a second surface of a first plate and a surface of a third plate, similar to the structures represented in FIGS. 4 and 5.

It should be noted that the reactors 10 according to the present disclosure are not limited to two layers of process channels 70 and 80, but may include more than two layers as shown in FIG. 12, wherein process channels are defined between a first plate 20 and a second plate 30, and between the first plate 20 and a third plate 40, and between the second plate 30 and an additional second plate 31. It should also be noted that more than two elongated channels 70 may be defined between first plate 20 and second plate 30, and more than two elongated channels 80 may be defined between first plate 20 and third plate 40 (and between any other additional plates, as desired). FIG. 13 shows a layout pattern for a reactor or module 10 wherein there are six elongated channels 70a-70f and six elongated channels 80a-80f, all forming a single fluidic path. (No detail of the channels themselves is shown in this figure, but the O-rings 50 are shown and the non-overlapping portions of the O-rings 60 are shown as underneath, in dashed outline.) The flow path progresses beginning at entry port/hole 27a, from 70a to 80a to 70b to 80b, and so forth.

As a further variation, it should be noted that multiple entrances such as by other through-holes not shown may be provided as desired or needed to allow for mixing or other operations to take place within the channels 70, 80.

Another advantage of the present disclosure is that it can reduce drastically the dead zone occurring between the two successive channel sections. For example, comparing FIG. 1 to FIGS. 2 and 3, for example, it is seen that the fluid path turns at the edges of the plate 120 of FIG. 1 can be longer than the minimum fluid path needed to pass through the first plate of FIGS. 2 and 3.

Further, the strength required to compress an O-ring and insure a good tightness is much lower than that required for a flat gasket. Sufficient compression can be obtained with a low effort and without any damage of the plate, even if there is deviation from the designed compression strength.

O-ring gasket material may be chosen in an appropriate manner to cope with the fluid corrosion. According to the fluids to be used, it can be any polymer or elastomer material, such as Viton, EPDM, fluoropolymer, perfluoropolymer, this list being given as an example and not as a restriction. As another alternative, combinations of these or other elastomeric materials may be employed. As one embodiment of this combination type, an FEP (fluorinated ethylene propylene) silicon O-ring may be used (an O-ring having a silicon core and an FEP envelope or cover). Such combinations can allow for both high flexibility and resilience on the one hand, and high chemical resistance on the other.

Another advantage of the present disclosure is that the number of O-ring gaskets used allows the plates to be in contact on several parallel lines, reducing the stress on each contact point and allowing a smooth position of the two adjacent plates one according to the other. In addition, the reduced distance between supporting lines created by the O-rings (relative to fewer or a single peripheral O-ring) reduces the stress and bending moment on the plate due to the strength formed by the internal pressure, which reduces the occurrence of breakage.

Figure 14:
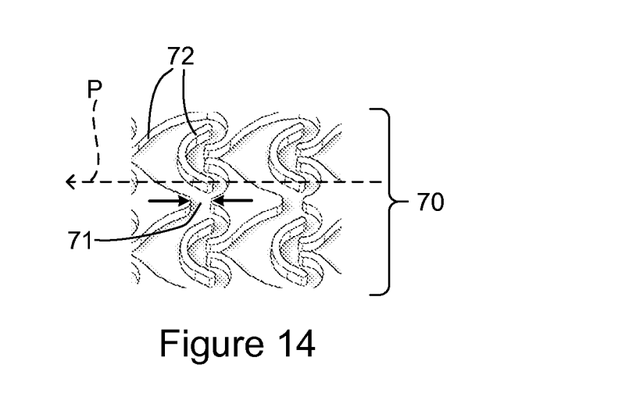
FIG. 14 is a plan view of alternative embodiment of a fluid channel useful in the context of the present disclosure.

As yet another advantage, by having elongated channels 70, 80 that are substantially linear and individually surrounded by at least one O-ring, significant fluidic bypass is prevented, even if, as shown in FIGS. 2 and 3, the structure of the channels 70, 80 is more complex than the shape enclosed by the O-ring. FIG. 14 shows an example of a channel 70 having further increased complexity relative to the FIG. 1 inset. In the structure of the channel 70 of FIG. 14, the channel walls 72 form two columns of successive heart-like shapes in the path P direction. The two columns are joined periodically along the path P by openings 71 between the two. Even more than two columns may also be used, if desired.

In addition to glass for transparency, a particularly preferred material for use in forming plates is silicon carbide, for its high chemical durability and high thermal conductivity. Although machining and/or even polishing of the mating surfaces may be desirable, the methods of the present invention can potentially provide good sealing of as-fired or as-sintered silicon carbide plates, or can allow for a reduced requirement for machining and/or polishing of the mating surfaces.

The methods and/or devices disclosed herein are generally useful in performing any process that involves mixing, separation, extraction, crystallization, precipitation, or otherwise processing fluids or mixtures of fluids, including multiphase mixtures of fluids and including fluids or mixtures of fluids including multiphase mixtures of fluids that also contain solids within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices:

polymerization; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

It will be apparent to those skilled in the art that various modifications and variations can be made without departing from the spirit or scope of the invention.

What is claimed is:

1. A plate-type flow reactor device comprising:
   at least a first plate having first and second opposing surfaces and one or more through-holes extending from the first to the second surface;
   at least a second plate having a second plate surface sealed against the first surface of the first plate by at least two first O-rings positioned between the first surface of the first plate and the second plate surface;
   at least a third plate having a third plate surface sealed against the second surface of the first plate by at least one second O-ring positioned between the second surface of the first plate and the third plate surface;
   two or more first elongated channels defined between the first surface of the first plate and the second plate surface by contours on or in the first surface and/or the second plate surface, and one or more second elongated channels defined between the second surface of the first plate and the third plate surface by contours on or in the second surface and/or the third plate surface, each channel of said first or second channels extending from a first end of the channel to a second end of the channel; wherein:
   for each one first channel of the two or more first elongated channels:
      said one first channel communicates, at the first or second end of the one first channel or both, with at least one channel of the one or more second elongated channels via one of the one or more of the through-holes through the first plate, and
      said one first channel of the two or more first elongated channels communicates with another first channel of the two or more first elongated channels only via a path including said at least one channel of the one or more second elongated channels, and
      each said one first channel is individually surrounded by at least one of the first O-rings and the at least one channel of the one or more second elongated channels is individually surrounded by the at least one second O-ring.

2. The device according to claim 1 wherein the two or more first elongated channels are defined between the first surface of the first plate and the second plate surface by contours on or in the first surface-only, and not on or in the second plate surface, and the at least one second elongated channel is defined between the second surface of the first plate and the third plate surface by contours on or in the second surface only, and not on or in the third plate surface.

3. The device according to claim 1, wherein the at least two first O-rings are retained within respective first grooves in said first surface, and the at least one second O-ring is retained within a respective second groove within said second surface.

4. The device according to claim 3 wherein each of the at least two first grooves and the at least one second groove have a size and shape identical to the others of the at least two first grooves and the at least one second groove.

5. The device according to claim 3 wherein each of said first and second grooves have a shape, in a plane parallel to the respective first and second surfaces, having a continuity of tangency.

6. The device according to claim 5 wherein the respective two or more first elongated channels and the one or more second elongated channels each have a more convoluted shape than the respective associated first or second groove.

7. The device according to claim 1 wherein each of the at least two first O-rings and each of the at least two second O-rings have a size and shape identical to the others of the at least two first O-rings and each of the at least two second O-rings.

8. The device according to claim 1 wherein at least one of said first, second and third plates comprises a brittle material.

9. The device according to claim 1 wherein at least one of said first, second and third plates comprises a sintered ceramic.

10. The device according to claim 9 wherein said sintered ceramic comprises silicon carbide.

11. The device according to claim 1 further comprising one or more spacers between the first plate and the second plate and one or more spacers between the first plate and the third plate.

12. The device according to claim 11 further comprising one or more extended structures extending beside the first, second, and third plates in a direction perpendicular to the first surface of the first plate, wherein the one or more spacers are positioned on the one or more extended structures.

13. The device according to claim 12 wherein the one or more spacers are both positioned on the one or more extended structures and stacked on each other.

* * * * *